United States Patent
Yum et al.

(10) Patent No.: US 11,374,712 B2
(45) Date of Patent: Jun. 28, 2022

(54) METHOD FOR RECEIVING REFERENCE SIGNAL IN WIRELESS COMMUNICATION SYSTEM AND DEVICE THEREFOR

(71) Applicant: LG Electronics Inc., Seoul (KR)

(72) Inventors: Kunil Yum, Seoul (KR); Kijun Kim, Seoul (KR); Jiwon Kang, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/610,260

(22) PCT Filed: Apr. 27, 2018

(86) PCT No.: PCT/KR2018/004935
§ 371 (c)(1),
(2) Date: Nov. 1, 2019

(87) PCT Pub. No.: WO2018/203624
PCT Pub. Date: Nov. 8, 2018

(65) Prior Publication Data
US 2021/0105114 A1    Apr. 8, 2021

Related U.S. Application Data

(60) Provisional application No. 62/501,077, filed on May 3, 2017.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 27/2613* (2013.01); *H04W 72/042* (2013.01)

(58) Field of Classification Search
CPC .................. H04L 5/0048; H04L 27/2613
See application file for complete search history.

(56) References Cited

U.S. PATENT DOCUMENTS 9,717,084 B2 * 7/2017 Nishikawa ........ H04W 72/1257
2014/0171073 A1 * 6/2014 Kim ...................... H04W 56/00
                                                                 455/434
(Continued)

FOREIGN PATENT DOCUMENTS

| KR | 20140110676 | 9/2014 |
|---|---|---|
| WO | WO2016032200 | 3/2016 |
| WO | WO2016032305 | 3/2016 |

OTHER PUBLICATIONS

Intel Corporation, "eMBB/URLLC multiplexing for DL," R1-1704763, 3GPP TSG RAN1 WG Meeting #88bis, Spokane, USA, dated Apr. 3-7, 2017, 6 pages.

(Continued)

*Primary Examiner* — Parth Patel
(74) *Attorney, Agent, or Firm* — Fish & Richardson P.C.

(57) ABSTRACT

A method by which a terminal receives a reference signal in a wireless communication system, according to one embodiment of the present disclosure, comprises the steps of: receiving a channel state information-reference signal (CSI-RS); and deriving a CSI by measuring the CSI-RS, wherein the CSI-RS is allocated to a wireless resource according to a preset time resource-related pattern, and the CSI-RS or a demodulation reference signal (DMRS) can be dropped according to predetermined priorities when the CSI-RS and the DMRS are overlapped on a symbol.

6 Claims, 17 Drawing Sheets

(51) Int. Cl.
*H04L 27/26* (2006.01)
*H04W 72/04* (2009.01)

(56) References Cited

U.S. PATENT DOCUMENTS

| | | | |
|---|---|---|---|
| 2015/0036616 A1* | 2/2015 | Lee | H04L 5/0023 370/329 |
| 2015/0215022 A1* | 7/2015 | Nagata | H04L 5/0048 370/329 |
| 2015/0256312 A1 | 9/2015 | Yi et al. | |
| 2016/0043848 A1* | 2/2016 | Kim | H04L 5/0016 370/280 |
| 2016/0094326 A1* | 3/2016 | Moon | H04L 5/0091 370/330 |
| 2016/0227428 A1* | 8/2016 | Novlan | H04L 5/0053 |
| 2016/0227526 A1* | 8/2016 | Park | H04L 5/0048 |
| 2017/0070312 A1 | 3/2017 | Yi et al. | |
| 2017/0180194 A1* | 6/2017 | Noh | H04L 5/0048 |
| 2018/0279291 A1* | 9/2018 | Tiirola | H04B 1/713 |
| 2018/0323923 A1* | 11/2018 | Wang | H04W 16/14 |
| 2019/0020395 A1* | 1/2019 | Xu | H04W 24/10 |
| 2019/0230578 A1* | 7/2019 | Karaki | H04W 74/0816 |
| 2020/0014517 A1* | 1/2020 | Takeda | H04L 5/023 |
| 2020/0021413 A1* | 1/2020 | Park | H04L 5/0026 |
| 2020/0037255 A1* | 1/2020 | Liu | H04W 52/281 |
| 2020/0296673 A1* | 9/2020 | Ouchi | H04W 52/325 |

OTHER PUBLICATIONS

InterDigital, "Collision handling between PRS and EPDCCH," R1-132177, 3GPP TSG RAN WG1 Meeting #73, Fukuoka, Japan, dated May 20-24, 2013, 5 pages.

LG Electronics, "Considerations on NR CSI-RS design for CSI acquisition," R1-1704886, 3GPP TSG RAN WG1 Meeting #88bis, Spokane, USA, dated Apr. 3-7, 2017, 4 pages.

LG Electronics, "Discussions on DL DMRS design for shortened TTI," R1-1702428, 3GPP TSG RAN WG1 Meeting #88, Athens, Greece, dated Feb. 13-17, 2017, 7 pages.

PCT International Search Report and Written Opinion in International Application No. PCT/KR2018/004935, dated Aug. 16, 2018, 17 pages (with English translation).

Qualcomm Incorporated, "Discussion on CSI-RS Design," R1-1702614, 3GPP TSG RAN WG1 #88, Athens, Greece, dated Feb. 13-17, 2017, 6 pages.

Samsung, "Discussions on CSI-RS design for NR MIMO," R1-1705350, 3GPP TSG RAN WG1 Meeting #88bis, Spokane, USA, dated Apr. 3-7, 2017, 6 pages.

* cited by examiner (a) Front-loaded CSI-RS (b) Back-loaded CSI-RS (a) n = 1

(b) n = 2

(a) n = 1

(b) n = 2

(a) n = 1

(b) n = 2

(a) Base CSI-RS pattern (b) CSI-RS with DMRS pattern (a) Case in which no CDM-F is applied (b) Case in which CDM-F is applied and length is 4

METHOD FOR RECEIVING REFERENCE SIGNAL IN WIRELESS COMMUNICATION SYSTEM AND DEVICE THEREFOR

CROSS-REFERENCE TO RELATED APPLICATIONS

This application is the National Stage application under 35 U.S.C. § 371 of International Application No. PCT/KR2018/004935, filed on 27 Apr. 2018, which claims the benefit of U.S. Provisional Application No. 62/501,077 filed on 3 May 2017. The disclosures of the prior applications are incorporated by reference in their entirety.

TECHNICAL FIELD

The present disclosure relates to a wireless communication system, and more particularly, to a method for receiving or transmitting a reference signal and device therefor.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

The object of the present disclosure is to provide a method for a reference signal. Specifically, the present disclosure proposes a method of allocating the reference signal, a method of handling an overlap or collision with other reference signals or channels, and a method of receiving or transmitting the reference signal based thereon.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of receiving a reference signal in a wireless communication system, which is performed by a user equipment (UE). The method may include receiving a channel state information-reference signal (CSI-RS) and calculating CSI by measuring the CSI-RS. The CSI-RS may be allocated to a radio resource according to a predetermined time resource pattern. When the CSI-RS overlaps with a demodulation reference signal (DMRS) in a symbol, the CSI-RS or the DMRS may be dropped according to predetermined priorities.

Additionally or alternatively, different predetermined priorities may be used depending on the purpose or usage of the CSI-RS.

Additionally or alternatively, different predetermined priorities may be used depending on the location of the symbol in which the CSI-RS overlaps with the DMRS.

Additionally or alternatively, different predetermined priorities may be used depending on the number of symbols for the DMRS.

Additionally or alternatively, the CSI-RS may not be allocated to a symbol between a symbol allocated for a physical downlink control channel (PDCCH) and a symbol allocated for the DMRS.

In another aspect of the present disclosure, provided is a UE for receiving a reference signal in a wireless communication system. The UE may include a transmitter, a receiver, and a processor configured to control the transmitter and the receiver. The processor may be configured to receive a CSI-RS and calculate CSI by measuring the CSI-RS. In this case, the CSI-RS may be allocated to a radio resource according to a predetermined time resource pattern. When the CSI-RS overlaps with a DMRS in a symbol, the CSI-RS or the DMRS may be dropped according to predetermined priorities.

Additionally or alternatively, different predetermined priorities may be used depending on the purpose or usage of the CSI-RS.

Additionally or alternatively, different predetermined priorities may be used depending on the location of the symbol in which the CSI-RS overlaps with the DMRS.

Additionally or alternatively, different predetermined priorities may be used depending on the number of symbols for the DMRS.

Additionally or alternatively, the CSI-RS may not be allocated to a symbol between a symbol allocated for a PDCCH and a symbol allocated for the DMRS.

In a further aspect of the present disclosure, provided is a method of transmitting a reference signal in a wireless communication system, which is performed by a base station. The method may include allocating a CSI-RS to a radio resource and transmitting the allocated CSI-RS to a UE. The CSI-RS may be allocated to the radio resource according to a predetermined time resource pattern. When the CSI-RS overlaps with a DMRS in a symbol, the CSI-RS or the DMRS may be dropped according to predetermined priorities.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the present disclosure, a UE can efficiently perform downlink reception.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
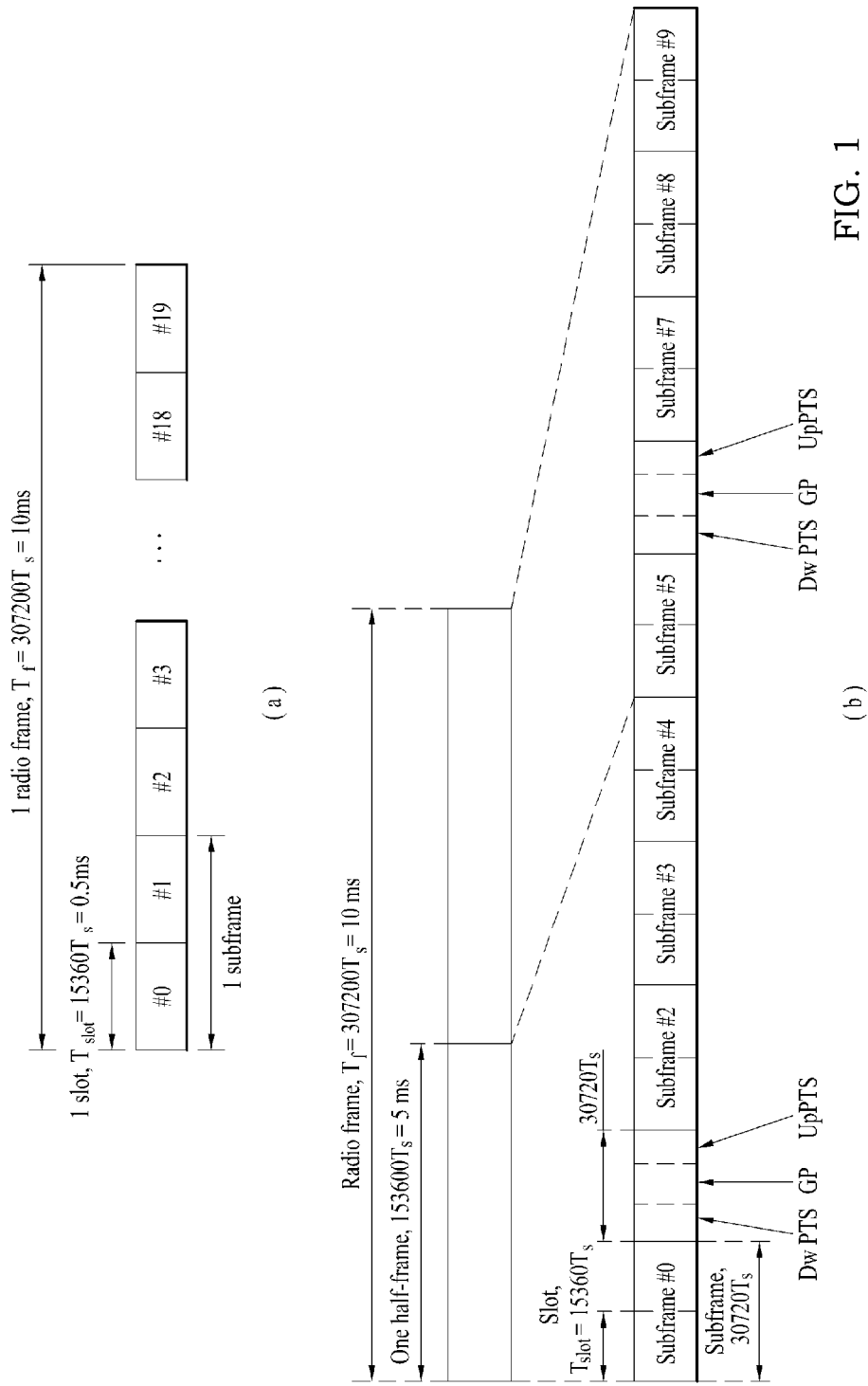
FIG. 1 is a diagram for an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
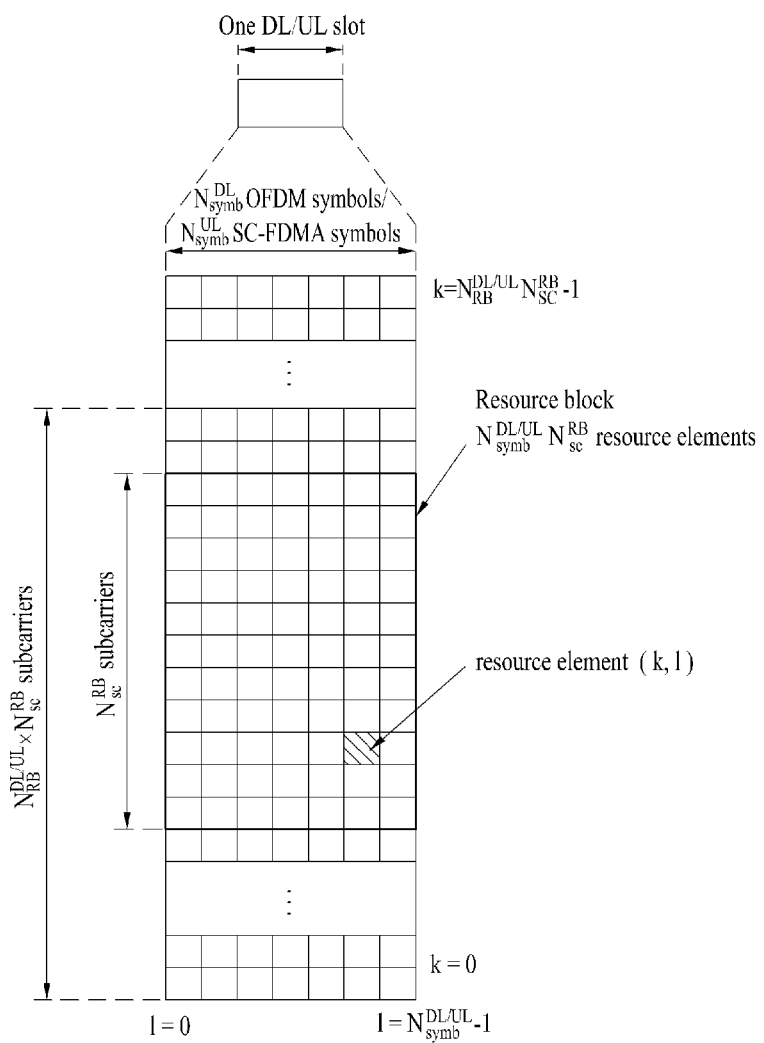
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/NL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=N_{RB}^{DL}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
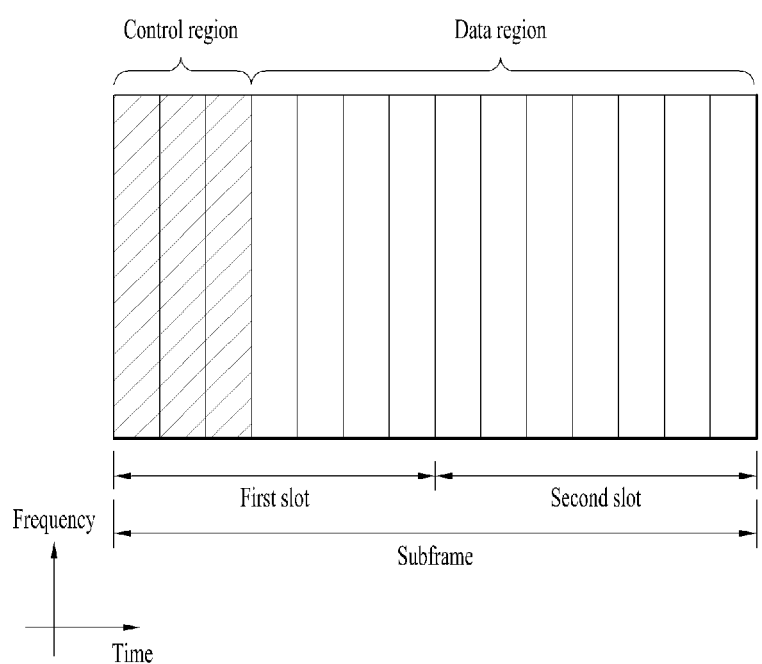
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |

TABLE 3-continued

| | Search Space | | |
|---|---|---|---|
| Type | Aggregation Level L | Size [in CCEs] | Number of PDCCH candidates $M^{(L)}$ |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
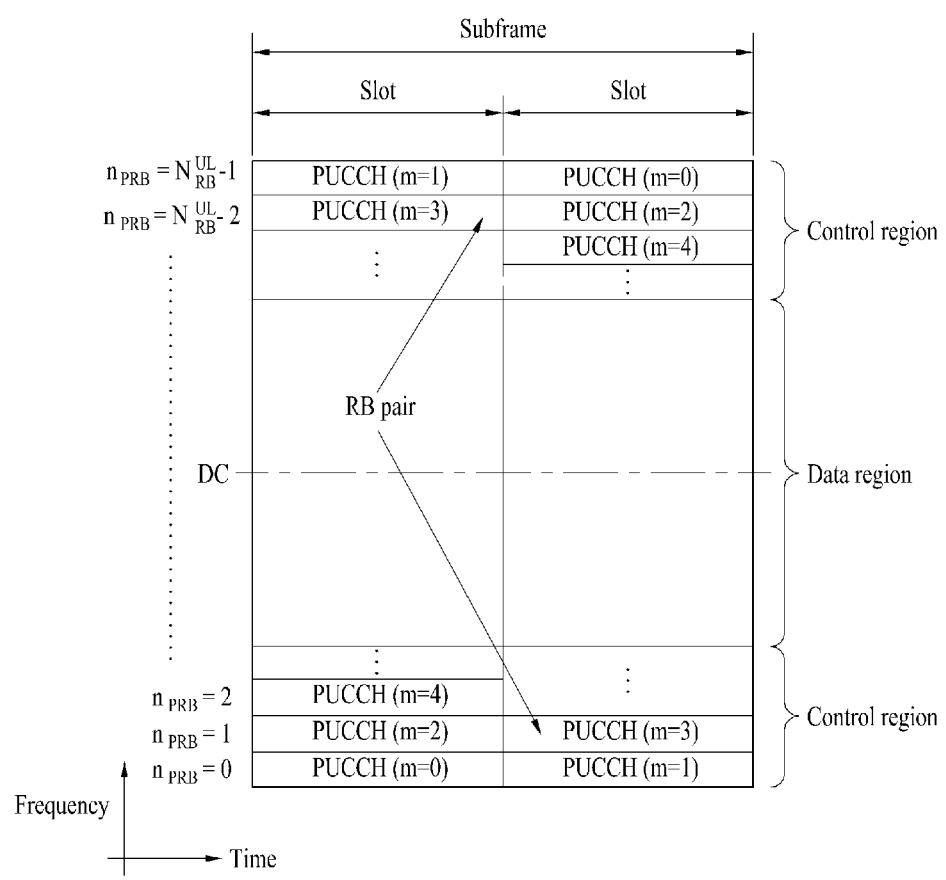
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

- Scheduling Request (SR): This is information used to request a UL-SCH resource and is transmitted using On-Off Keying (OOK) scheme.
- HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.
- Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Channel State Information-Reference Signal (CSI-RS)

In 3GPP LTE(-A), the antenna port for transmitting a CSI-RS is referred to as a CSI-RS port, and the location of resources in a predetermined resource region where a CSI-RS port(s) transmits a corresponding CSI-RS(s) is referred to as a CSI-RS pattern or a CSI-RS resource configuration. In addition, a time-frequency resources where the CSI-RS is allocated/transmitted is referred to as a CSI-RS resource. For example, a resource element (RE) used for CSI-RS transmission is referred to as a CSI-RS RE. Compared to the CRS where the location of the CSI-RS RE is fixed for each antenna port, the CSI-RS has a maximum of 32 different configurations to reduce inter-cell interference (ICI) under a multi-cell environment including a heterogeneous network environment. The CSI-RS configuration may depend on the number of antenna ports in a cell and be implemented such that neighboring cells have different structures. Unlike the CRS, the CSI-RS may support a maximum of 8 antenna ports (p=15, p=15, 16, p=15, . . . , 18, and p=15, . . . , 22) and is defined only for f=15 kHz. Antenna ports of p=15, . . . , 22 may correspond to CSI-RS ports of p=0, . . . , 7, respectively.

The CSI-RS configuration may depend on the number of CSI-RS ports. If two CSI-RS ports are used for CSI-RS transmission, there are 20 CSI-RS configurations. If four CSI-RS ports are used for CSI-RS transmission, there are 10 CSI-RS configurations. If 8 CSI-RS ports are used for CSI-RS transmission, there are five CSI-RS configurations. A number may be assigned to each of the CSI-RS configurations defined according to the number of CSI-RSs.

The CSI-RS configurations have the nested property. The nested property may mean that the CSI-RS configuration for a large number of CSI-RS ports becomes a super-set of that for a small number of CSI-RS ports. For example, REs in CSI-RS configuration 0 for four CSI-RS ports may be included in resources in CSI-RS configuration 0 for 8 CSI-RS ports.

A plurality of CSI-RSs may be used for a given cell. In the case of a non-zero power CSI-RS, a single CSI-RS configuration may be used for transmission thereof. Meanwhile, in the case of a zero-power CSI-RS, a plurality of CSI-RS configurations may be used for transmission thereof. A UE may assume zero transmission power for resources except resources that the UE should assume as the non-zero power CSI-RS among resources corresponding to the zero-power CSI-RS. In the case of a TDD radio frame, no CSI-RS is transmitted in any one of a special subframe in which DL transmission and UL transmission coexist, a subframe in which a paging message is transmitted, and a subframe in which transmission of a synchronization signal, a physical broadcast channel (PBCH) or system information block 1 (SIB1) collides with the CSI-RS. That is, the UE assumes that no CSI-RS is transmitted in the above subframes.

Meanwhile, time-frequency resources used by a CSI-RS port for transmission of a corresponding CSI-RS are not used for PDSCH transmission on any antenna ports. In addition, these time-frequency resources are not used for CSI-RS transmission on other antenna ports except the corresponding CSI-RS port.

Since time-frequency resources used for CSI-RS transmission are not used for data transmission, data throughput decreases as CSI-RS overhead increases. Therefore, the CSI-RS may be configured such that it is transmitted at every predetermined transmission period corresponding to multiple subframes, instead of being transmitted in each subframe. In this case, CSI-RS transmission overhead may be significantly reduced compared to when the CSI-RS is transmitted in each subframe. Hereinafter, a subframe configured for CSI-RS transmission is referred to as a CSI-RS subframe.

ABS may inform a UE of the following parameters through higher layer signaling (for example, medium access control (MAC) signaling, radio resource control (RRC) signaling, etc.)

Number of CSI-RS ports
CSI-RS configuration
CSI-RS subframe configuration, $I_{CSI-RS}$
CSI-RS subframe configuration period, $T_{CSI-RS}$
CSI-RS subframe offset, $_{CSI-RS}$ If necessary, the BS may inform the UE of not only the configuration of a CSI-RS transmitted with zero power but also the configuration of a subframe in which the zero-power CSI-RS is transmitted.

Channel State Information-Interference Measurement (CSI-IM)

In 3GPP LTE Rel-11, a UE may be configured with one or more CSI-IM resource configurations. A CSI-IM resource is used for interference measurement. The CSI-RS configuration and the CSI-RS subframe configuration ($I_{CSI-RS}$) may be configured for each CSI-IM resource through higher layer signaling.

CSI Reporting

In the 3GPP LTE (-A) system, a UE is defined to report CSI to a BS. Herein, the CSI means information indicating the quality of a radio channel (also called a link) created between a UE and an antenna port. The CSI includes, for example, a rank indicator (RI), a precoding matrix indicator (PMI), and a channel quality indicator (CQI). The RI, which indicates rank information of a channel, means the number of streams that a UE receives on the same time-frequency resource. The RI is determined depending on long-term fading of a channel, and thus it is usually fed back to a BS by a UE with a longer periodicity than that of the PMI or CQI. The PMI is a value reflecting the channel space property and indicates a precoding index preferred by a UE based on a metric such as a signal-to-interference-plus-noise ratio (SINR). The CQI is a value indicating the intensity of a channel and typically indicates a received SINR obtained when the PMI is used by a BS.

Based on measurement of the radio channel, a UE calculates its preferred PMI and RI, which is capable of attaining the optimal or highest transmission rate when used by a BS, in the current channel state and feeds back the calculated PMI and RI to the BS. Herein, the CQI refers to a modulation and coding scheme of providing an acceptable packet error probability for the fed-back PMI/RI.

New Radio Technology (NR)

Hereinabove, the structure, operation or function of the 3GPP LTE (-A) system has been described. The structure, operation, or function of the 3GPP LTE (-A) system may be slightly modified or differently implemented in the NR system. It will be described in brief.

The NR system supports various numerologies. For example, the NR system supports not only a subcarrier spacing of 15 kHz but also a subcarrier spacing that is $2^n$ times higher than the 15 kHz subcarrier spacing (where n=1, 2, 3, or 4).

In the case of a normal CP, the number of OFDM symbols in each slot (hereinafter, an OFDM symbol is simply referred to as a symbol) is fixed to 14, but the number of slots in one subframe is supported up to $2^k$ (where k=0, 1, 2, 3, or 4). However, a radio frame is composed of 10 subframes as in the legacy LTE system. In the case of an extended CP, the number of symbols in each slot is fixed to 12, and one subframe is composed of four slots. In addition, one RB is defined as 12 consecutive subcarriers in the frequency domain as in the legacy LTE system.

The usage of each symbol (e.g., DL symbol, UL symbol, or flexible symbol) in one slot may be defined depending on slot formats, and both DL and UL symbols may be configured in one slot. This structure is referred to as a self-contained subframe (or slot) structure.

The present disclosure proposes a method of determining the location at which a CSI-RS is to be transmitted based on the locations and configurations of other resources, for example, a (additional) DMRS, a phase tracking reference signal (PTRS), a PDCCH, etc. when the CSI-RS location, i.e., RE mapping is determined in a full-dimension MIMO (FD-MIMO) environment and NR. Since different signaling cannot be transmitted in the same RE and in the case of the DMRS, data demodulation performance increases as a resource becomes closer to the DMRS, the corresponding resource needs to be protected from CSI-RS transmission. Particularly, since the additional DMRS may be turned on/off dynamically depending on the UE state and not be transmitted at all times, it is inefficient to define a CSI-RS pattern by assuming the corresponding resource. In the case of the PTRS, the presence of the PTRS may be determined by the UE's modulation order, and the length of a control channel may vary (for example, one or two symbols). Thus, the CSI-RS pattern and the configuration/signaling thereof may be determined by considering the above issues.

In the present specification, the term "base station" may refer to a transmission and reception point such as a cell, base station, eNB, gNB, sector, transmission point (TP), reception point (RP), remote radio head (RRH), relay, etc. In addition, the term may be used as a comprehensive term for identifying a component carrier (CC) at a specific transmission and reception point.

Hereinafter, a point at which a DL/UL signal is transmitted/received to/from a UE is referred to as a transmission and reception point (TRP). The TRP may correspond to a specific physical cell, a plurality of physical cell groups, a specific analog beam, or a specific analog beam group. In addition, an antenna port may mean a virtual antenna element where the same channel characteristics (e.g., delay profile, Doppler spread, etc.) can be assumed (at least in the same RB). Moreover, a slot may mean a repeated transmission unit having a predetermined time length, but the definition thereof may be changed for each numerology.

The present disclosure assumes that the DMRS is allocated in the following symbol order: 3rd-9th-(6th-12th) and in the case of a front-loaded CSI-RS, there is a limitation of a maximum of two symbols for fast CSI feedback. A DMRS allocated to the 3rd symbol is referred to a default DMRS. The default DMRS means a DMRS that is always transmitted regardless of the UE state (e.g., speed, required MCS level, etc.). The remaining DMRSs (DMRSs in the 6th, 9th, and 12th symbols) are additional DMRSs. The additional DMRS means a DMRS that may be transmitted or not depending on the UE state. However, the present disclosure is not limited to the above assumption.

Figure 5:
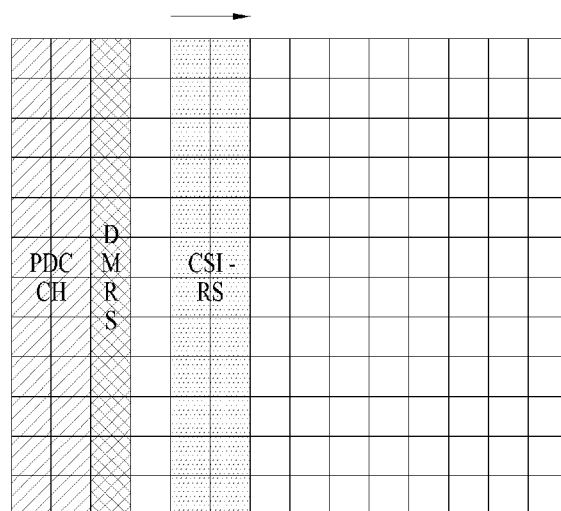
FIGS. 5 to 12 illustrate CSI-RS allocation patterns considering a PDCCH and a DMRS.
Figure 5:
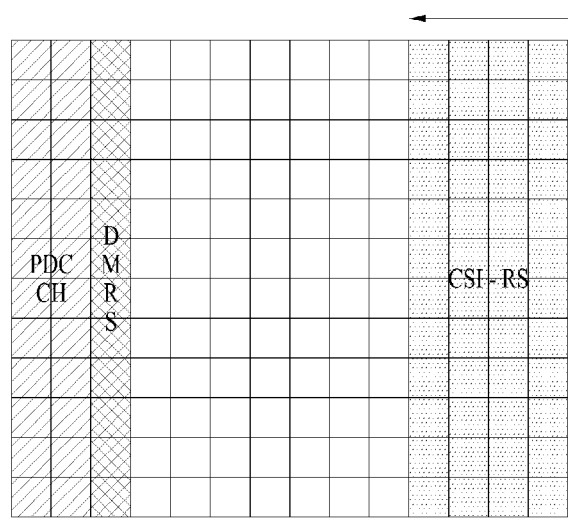

Depending on the location in a slot, the CSI-RS introduced in the present disclosure may be divided into a front-loaded CSI-RS and a back-loaded CSI-RS. The former is placed on front symbols in the slot and may be used for fast CSI reporting in the case of a self-contained slot. The latter is placed on rear symbols in the slot and may be used for general cases. FIG. 5 illustrates the two CSI-RSs. However, the present disclosure is not limited to the two CSI-RSs. In particular, a CSI-RS pattern where there is no DMRS between CSI-RSs is referred to as a base CSI-RS pattern.

For convenience of description, proposed methods will be described based on systems discussed in the NR, However, the proposed methods are applicable to other systems (e.g., LTE, UTRA, etc.).

DMRS

Regarding the DMRS, CSI-RS allocation may be performed according to the following rules.

The DMRS needs to be protected if possible since DMRS dropping affects data demodulation performance.

The data demodulation performance increases as a resource becomes closer to the DMRS, CSI-RS RE allocation should not be performed on n symbols around the DMRS (for example, n=1).

Depending on the number of DMRS symbols, the CSI-RS allocation may be performed as follows. Although a front-loaded DMRS is taken as an example, the front-loaded DMRS may correspond to a basic DMRS that is transmitted with no additional DMRS (i.e., default DMRS). In FIGS. 5 to 14, the arrow indicates the starting location and extension direction when the number of symbols occupied by the CSI-RS is changed. For example, in FIG. 5 (b), if the CSI-RS occupies one symbol, the CSI-RS may be allocated to the 14th symbol. If the CSI-RS occupies two symbols, the CSI-RS may be allocated to the 13th and 14th symbols. This pattern may mean time resources allocated for the CSI-RS. A frequency region in the corresponding resources, allocation of code division multiplexed (CDMed) resources, and association between ports and actual resources may be separately defined, configured, or signaled.

1. Case in which only front-loaded DMRS is present

A. Front-Loaded CSI-RS (According to the Value of n, where n is the Number of Protected Symbols Around the DMRS)

Figure 6:
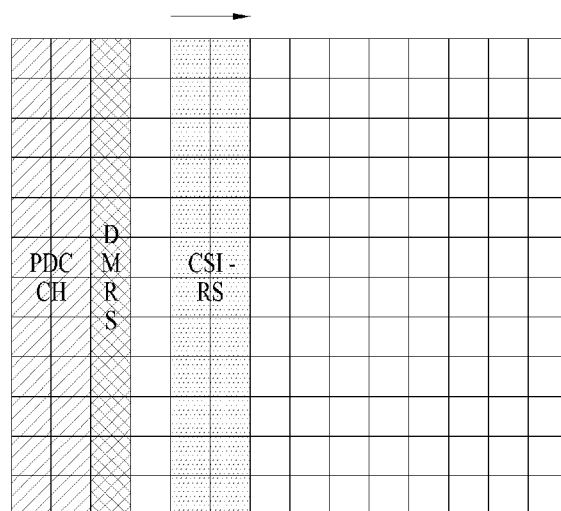
Figure 6:
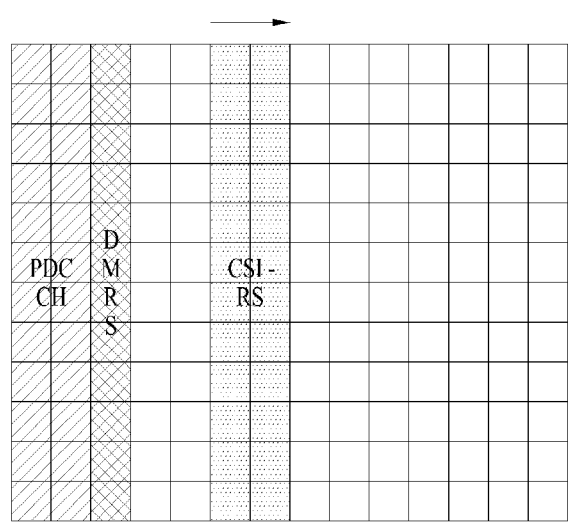

When only the front-loaded DMRS is allocated in a slot or subframe, the front-loaded CSI-RS may be allocated. FIG. 6 illustrates that the CSI-RS is allocated apart by n symbols from the DMRS symbol.

B. Back-Loaded CSI-RS

Figure 7:
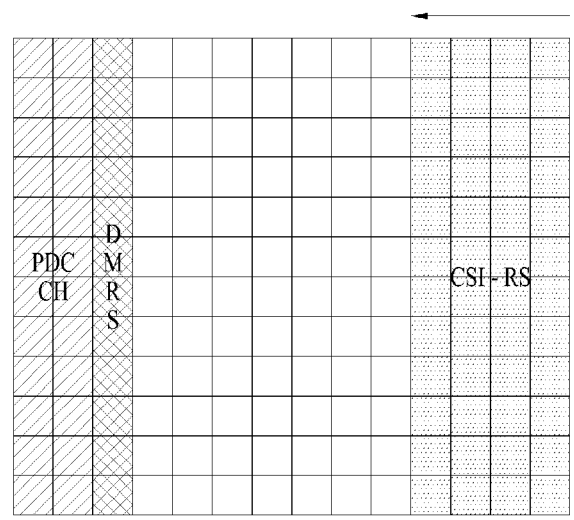

When only the front-loaded DMRS is allocated in a slot or subframe, the back-loaded CSI-RS may be allocated. FIG. 7 illustrates that the back-loaded CSI-RS is allocated when only the front-loaded DMRS is allocated.

2. Case in which separated 2-symbol DMRS (i.e., additional DMRS) is present

A. Front-Loaded CSI-RS

Figure 8:
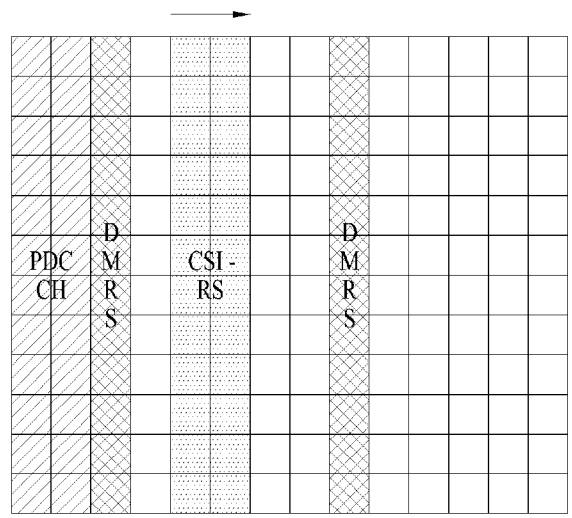
Figure 8:
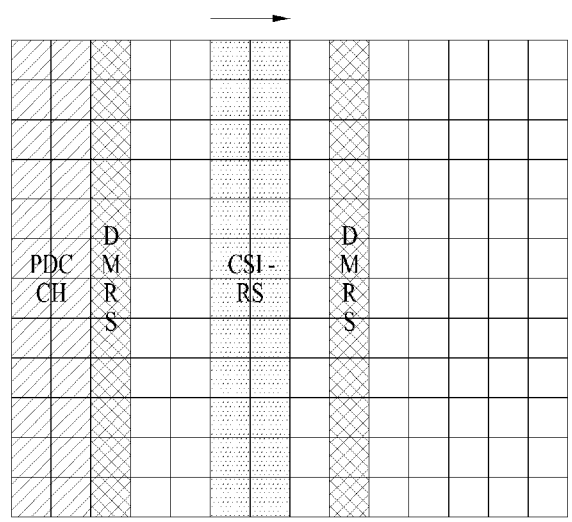

When the separated 2-symbol DMRS is allocated in a slot or subframe, the front-loaded CSI-RS may be allocated. FIG. 8 illustrates that the CSI-RS is allocated apart by n symbols from the DMRS symbol.

If the value of n is unable to satisfy conflicts between the two DMRS symbols, i.e., distances from the two DMRS symbols at the same time, a distance from one of the two DMRS symbols (for example, the distance from the preceding DMRS) may be prioritized.

B. Back-Loaded CSI-RS

Figure 9:
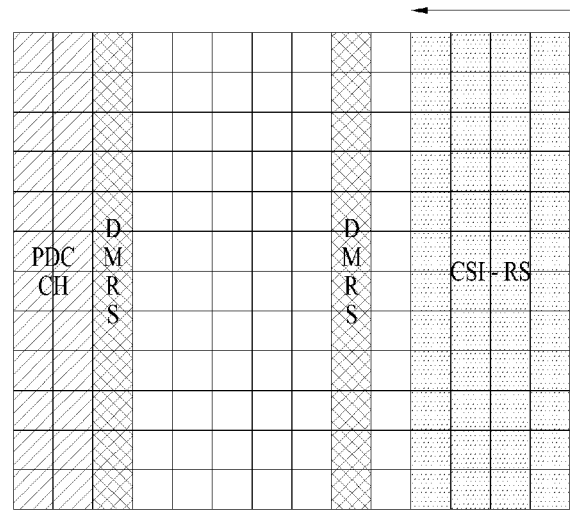
Figure 9:
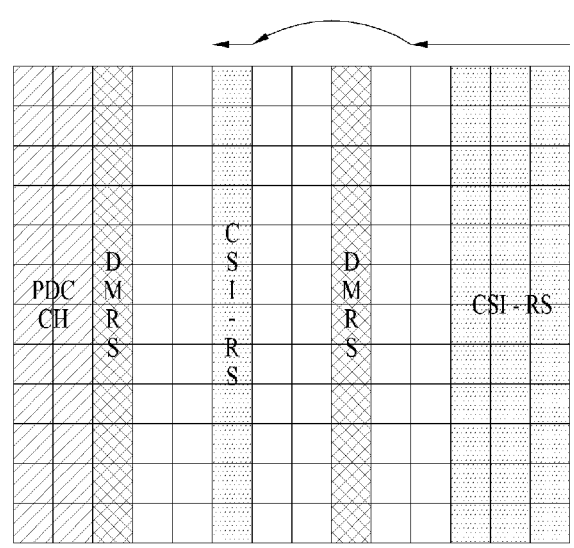

When the separated 2-symbol DMRS is allocated in a slot or subframe, the back-loaded CSI-RS may be allocated. FIG. 9 illustrates that the back-loaded CSI-RS is allocated apart by n symbols from the DMRS symbol.

3. Separated 4-symbol DMRS (additional DMRS)

A. Front-Loaded CSI-RS

Figure 10:
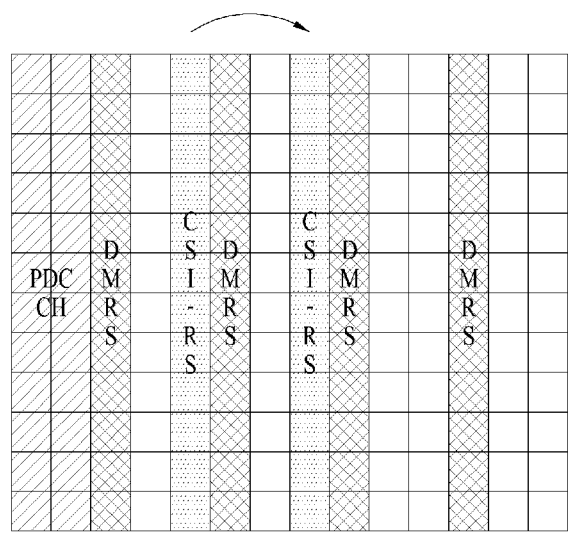
Figure 11:
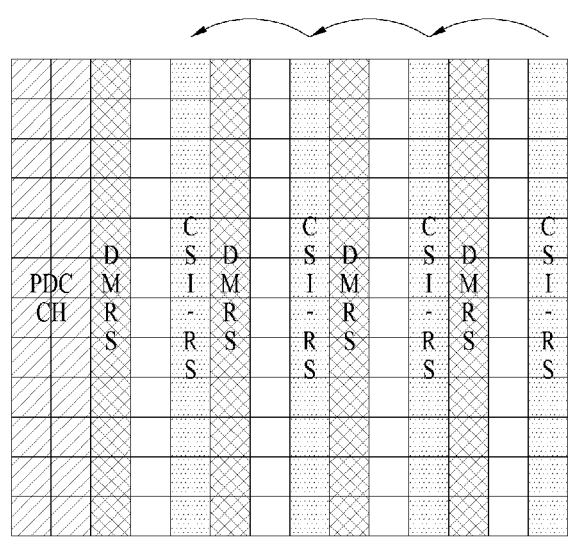

When the separated 4-symbol DMRS is allocated in a slot or subframe, the front-loaded CSI-RS may be allocated. FIG. 10 illustrates that the front-loaded CSI-RS is allocated when the separated 4-symbol DMRS is allocated.

In this case, even though n=1, one of the two symbols around the DMRS corresponding to n=1 is protected since there is no space for performing the CSI-RS allocation and protecting the other symbol.

B. Back-Loaded CSI-RS

When the separated 4-symbol DMRS is allocated in a slot or subframe, the back-loaded CSI-RS may be allocated. FIG. 10 illustrates that the back-loaded CSI-RS is allocated when the separated 4-symbol DMRS is allocated.

In this case, only a CSI-RS where time-domain CDM (CDM-T) is not applied may be used. In the case of a CSI-RS to which the CDM-T is applied, a pattern thereof should be defined over two consecutive symbols to minimize temporal channel variation and improve the decoding performance of the Walsh code. However, since a CSI-RS defined over two consecutive symbols occupies the entirety of a PDSCH region between DMRSs as described in the example of the present disclosure, the CSI-RS may not be desirable. Therefore, only the CSI-RS to which no CDM-T is applied may be used.

To use the above CSI-RS pattern, the following methods are proposed.

1. Signaling indicating whether the DMRS is present is transmitted to a UE together with the CSI-RS and rate-matching (RM) signaling.

A. The UE may measure/report CSI by assuming the base CSI-RS pattern according to the signaling or by assuming "CSI-RS with DMRS pattern" (i.e., a pattern where the DMRS is allocated between CSI-RSs). In particular, if a TRP transmits a different DMRS configuration, the UE may operate by assuming the CSI-RS with DMRS pattern based on a corresponding DMRS configuration.

B. Signaling i. For dynamic signaling, DCI signaling may be supported.

Figure 12:
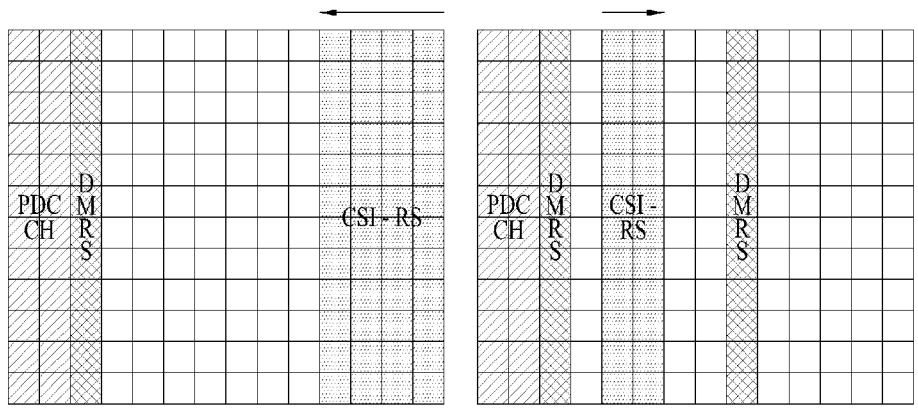
Figure 12:
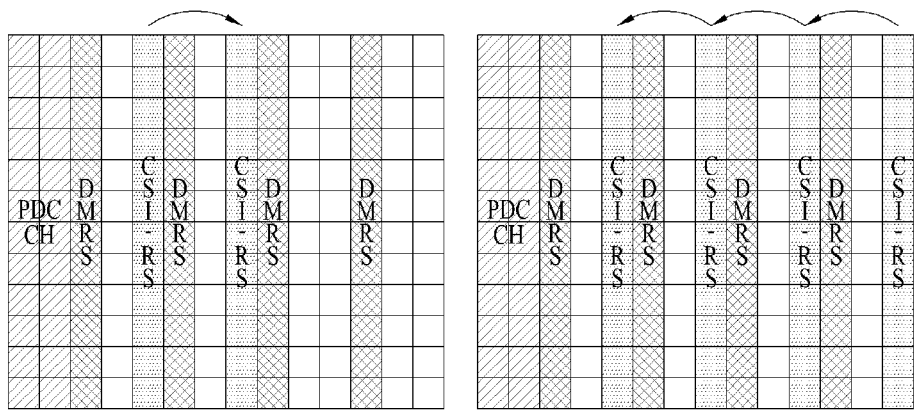

In particular, signaling for distinguishing the base CSI-RS pattern from the CSI-RS pattern with the DMRS may be transmitted to the UE using 1-bit signaling in DCI. FIG. 12 illustrates the base CSI-RS pattern and the CSI-RS with DMRS pattern.

a) Since up to a 2-symbol DMRS does not affect the CSI-RS location, a 4-symbol DMRS case may be distinguished from other cases using one bit.

ii. The UE may be configured with a periodic and/or semi-persistent CSI-RS through higher layer signaling, for example, RRC and/or MAC signaling.

2. Instead of adding separate signaling, the above method may be limited such that it is applied to an aperiodic CSI-RS use case for a scheduled UE.

When a UE is scheduled to receive the DMRS, the UE does not require separate signaling on the DMRS structure. Thus, the corresponding UE determines whether to use the base CSI-RS pattern or the CSI-RS with DMRS pattern based on the received DMRS structure (for example, depending on whether there is an additional DMRS). In this case, RM for another cell may not be considered, or the above-described signaling may be included only in the RM signaling.

3. A single static (or semi-static) pattern considering the above-described rules may be used, and a priority rule (for RS dropping) may be introduced.

In this case, the CSI-RS pattern is not changed over time.

The priority rule may be defined as follows: default DMRS>CSI-RS>additional DMRS. In other words, when the default DMRS overlaps with the CSI-RS, the CSI-RS may be dropped. When the additional DMRS overlaps with the CSI-RS, additional DMRS may be dropped.

Figure 13:
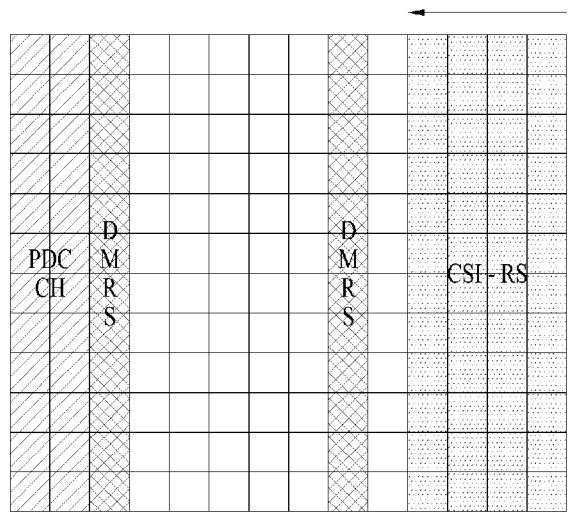
FIGS. 13 and 14 illustrate processing when a CSI-RS overlaps with a DMRS.
Figure 13:
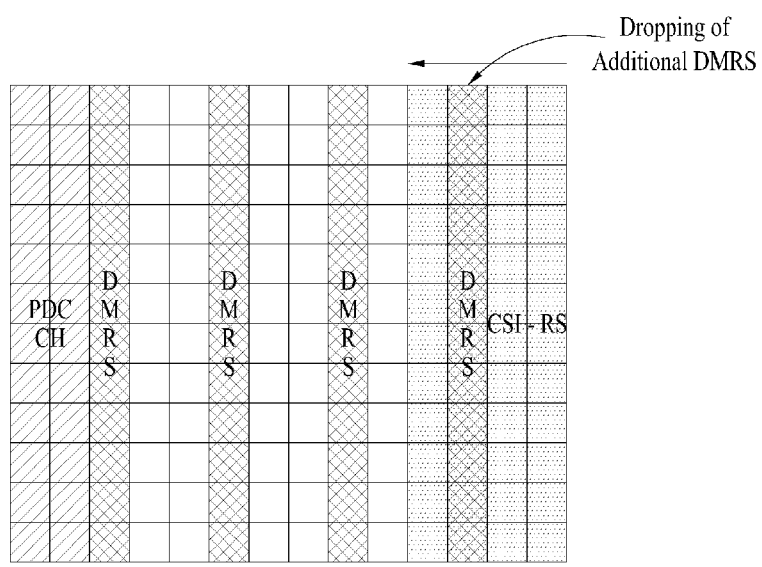

To minimize performance degradation, dropping may be performed on an overlapping-RE basis. In addition, CSI that is calculated/reported by measuring a corresponding CSI-RS (i.e., a CSI-RS overlapping with the default DMRS) may be dropped to avoid reporting the defected CSI. FIG. 13 illustrates a case in which the additional DMRS overlapping with the back-loaded CSI-RS is dropped.

In the example of FIG. 13, since the DMRS in the 12th symbol does not assist data demodulation, dropping of the corresponding DMRS symbol may not significantly affect the performance of the data demodulation.

Figure 14:
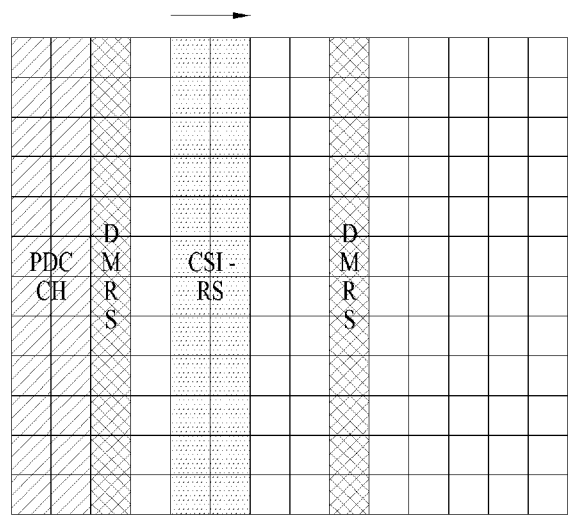
Figure 14:
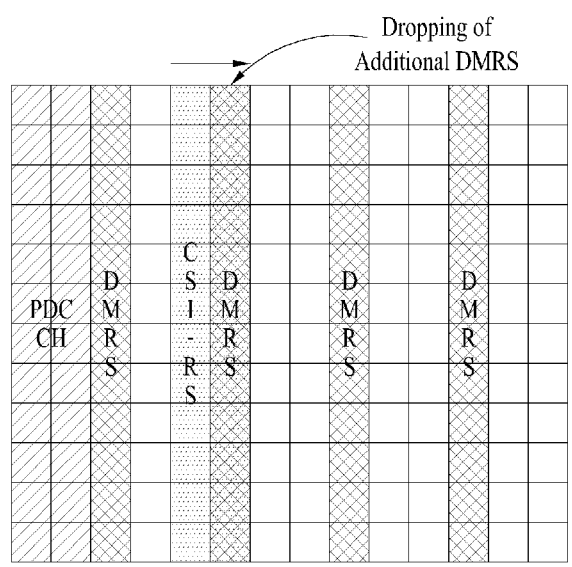

FIG. 14 illustrates a case in which the additional DMRS overlapping with the front-loaded CSI-RS is dropped. In the example of FIG. 14, data in the 7th symbol may be demodulated by the DMRS in the 3rd/9th symbol.

In this case, to protect the DMRS in the 6th symbol, it may be considered that the priority between the CSI-RS and DMRS is changed for each location (e.g., symbol).

Priority rule for 12th symbol: default DMRS>CSI-RS>additional DMRS

Priority rule for 6th symbol: DMRS>CSI-RS or default DMRS>additional DMRS>CSI-RS Alternatively, the priority may be changed depending on the number of DMRS symbols.

Priority rule: default DMRS>additional DMRS for 2-symbol DMRS>CSI-RS>additional DMRS for 4-symbol DMRS In this case, a different priority rule may be applied depending on the purpose or usage of the CSI-RS (e.g., beam management, CSI acquisition, etc.). In particular, the CSI-RS may have a higher priority than the default DMRS. Since an analog beam different from that of a PDSCH may be applied to a CSI-RS symbol for beam management, data multiplexing is not performed on the corresponding CSI-RS symbol, and thus, no DMRS is required.

Priority rule: CSI-RS for beam management>default DMRS>CSI-RS for CSI acquisition>additional DMRS.

When the DMRS is allocated to two or more consecutive symbols, allocation may be performed in a similar manner as described above.

PTRS

Regarding the PTRS, CSI-RS allocation may be performed according to the following rules.

Considering frequency-domain CDM (CDM-F) between the PTRS and CSI-RS, the location of the CSI-RS may be configured as follows.

Figure 15:
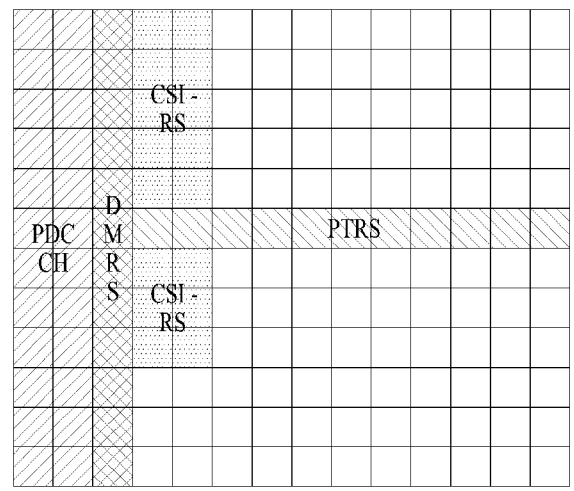
FIG. 15 illustrates a CSI-RS allocation pattern considering a PDCCH, a DMRS, and a phase tracking reference signal.
Figure 15:
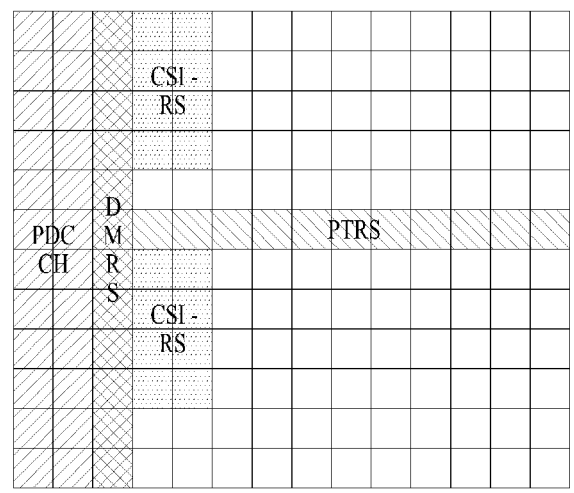

1. The CSI-RS may be allocated on a CDMed resource basis by skipping the PTRS. FIG. 15 illustrates a CSI-RS pattern where the CSI-RS is allocated by skipping the PTRS.

When the PTRS is located at the top or bottom of an RB, the CSI-RS pattern does not need to be changed. However, in this case, the CSI-RS may be limited such that a maximum of 11 REs/RBs are used for each symbol in the frequency domain.

Figure 16:
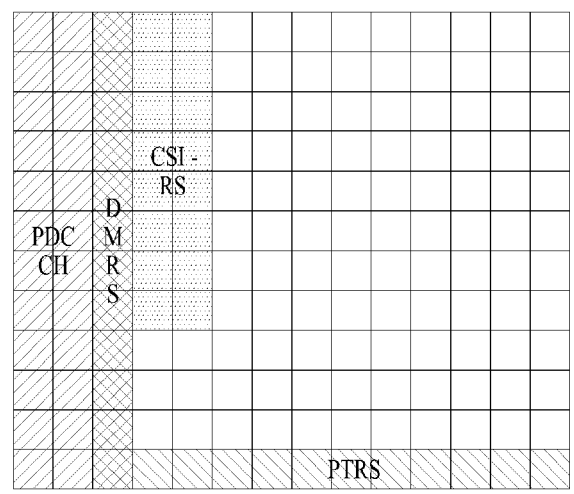
FIG. 16 illustrates an example of allocating a CSI-RS by considering the locations of symbols to which a PDCCH and a DMRS are allocated.

That is, there may be a restriction that a maximum of 8 ports is used for one CSI-RS symbol. FIG. 16 illustrates a CSI-RS pattern where the PTRS is allocated at the bottom of an RB (i.e., at the lowest frequency index thereof).

This pattern means only frequency resources for the CSI-RS. A time-domain region in the corresponding resources, allocation of CDMed resources, and association between antenna ports and actual resources may be separately defined, configured, or signaled.

To use the above CSI-RS pattern, the following methods are proposed.

1. A TRP may transmit to a UE signaling for indicating the presence or absence of the PTRS together with the CSI-RS and RM signaling. The UE may operate by assuming the base CSI-RS pattern or a CSI-RS with PTRS pattern according to the signaling.

For dynamic signaling, the signaling may be transmitted in DCI. Particularly, signaling for distinguishing between the base CSI-RS pattern and the CSI-RS with PTRS pattern may be transmitted to the UE using one bit in the DCI.

The UE may be configured with the periodic and/or semi-persistent CSI-RS through higher layer signaling, for example, RRC and/or MAC signaling.

2. Instead of adding separate signaling, the above method may be limited such that it is applied to an aperiodic CSI-RS use case for a scheduled UE.

When a UE is scheduled to receive the PTRS, the UE does not require separate signaling on the DMRS structure. Thus, the corresponding UE determines whether to use the base CSI-RS pattern or the CSI-RS with PTRS pattern based on the received PTRS structure. In this case, RM for another cell may not be considered, or the above-described signaling may be included only in the RM signaling.

3. A single static (or semi-static) pattern considering the above-described rules may be used, and a priority rule (for RS dropping) may be introduced.

The priority rule may be defined as follows: PTRS>CSI-RS. When the PTRS overlaps with the CSI-RS, the CSI-RS is dropped to protect the PTRS.

As another example, the priority rule may be defined as follows: CSI-RS>PTRS. When the PTRS overlaps with the CSI-RS, the PTRS may be dropped. When the CSI-RS is shared by two or more UEs, a UE that does not receive the PTRS may not know whether corresponding resources overlap. Thus, considering a non-scheduled UE, the priority of the PTRS may be set lower than that of the CSI-RS to share the CSI-RS.

In this case, a different priority rule may be applied depending on the purpose or usage of the CSI-RS (e.g., beam management, CSI acquisition, etc.). In particular, the CSI-RS may have a higher priority than the PTRS. Since an analog beam different from that of a PDSCH may be applied to a CSI-RS symbol for beam management, data multiplexing is not performed on the corresponding CSI-RS symbol, and thus, no PTRS is required.

For example, the priority rule may be defined as follows: CSI-RS for beam management>PTRS>CSI-RS for CSI acquisition.

If a reduced additional DMRS, which uses only some subcarriers in the frequency domain, is supported, similar methods to those for the PTRS (e.g., a CSI-RS pattern configuration method, a signaling method, etc.) may be used.

PDCCH Length (for Front-Loaded CSI-RS)

The time-domain length or location of a PDCCH (i.e., times resources occupied by the PDCCH) may vary. In this case, regarding the location/length of the PDCCH, CSI-RS allocation may be performed according to the following rules.

In the case of an aperiodic CSI-RS, the CSI-RS may not be allocated to one symbol after the PDCCH (in a direction in which the symbol index increases in the time domain), and more particularly, between the front-loaded DMRS and the PDCCH.

In this case, since the location of the CSI-RS does not change even though the PDCCH changes, the CSI-RS may be allocated to a position apart by a fixed length (e.g., the longest PDCCH length) regardless of the actual length of the PDCCH. In addition, if the location of the front-loaded DMRS is fixed, the CSI-RS may be configured to be transmitted at least in a symbol after the front-loaded DMRS.

Since each of the examples of the proposed methods may be included as one method for implementing the present disclosure, it is apparent that each example can be regarded as a proposed method. In addition, although the proposed methods may be implemented independently, some of the proposed methods may be combined (or merged) for implementation. Moreover, it may be regulated that information on whether the proposed methods are applied (or information on rules related to the proposed methods) should be transmitted from a BS to a UE through a predefined signal (e.g., a physical layer signal, a higher layer signal, etc.).

Figure 17:
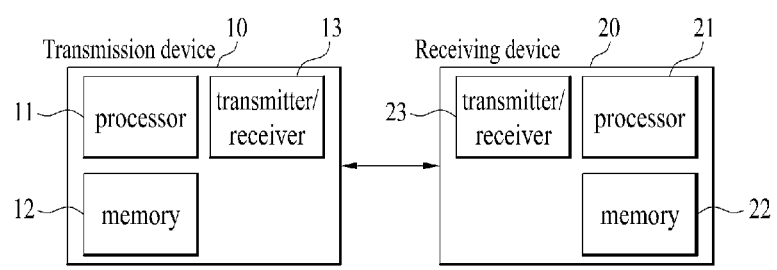
FIG. 17 is a block diagram for a device configured to implement embodiment(s) of the present disclosure.

FIG. 17 is a block diagram of a transmitting device 10 and a receiving device 20 configured to implement exemplary embodiments of the present disclosure. Referring to FIG. 17, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

In one of the embodiments, provided is a UE for performing channel and interference measurement in a wireless communication system. The UE may include a transmitter, a receiver, and a processor configured to control the transmitter and the receiver. The processor may be configured to receive a CSI-RS and calculate CSI by measuring the CSI-RS. In this case, the CSI-RS may be transmitted or received based on a predetermined time resource pattern. When the CSI-RS overlaps with a DMRS in a symbol, the CSI-RS or the DMRS may be dropped according to predetermined priorities.

Additionally, different predetermined priorities may be used depending on the purpose or usage of the CSI-RS.

Additionally, different predetermined priorities may be used depending on the location of the symbol in which the CSI-RS overlaps with the DMRS.

Additionally, different predetermined priorities may be used depending on the number of symbols for the DMRS.

Additionally, the CSI-RS may not be allocated to a symbol between a symbol allocated for a PDCCH and a symbol allocated for the DMRS.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations can be made therein without departing from the spirit and scope of the disclosure. Therefore, the present disclosure is not limited by the embodiments disclosed herein but intends to give the broadest scope matching the principles and new features disclosed herein.

INDUSTRIAL APPLICABILITY

The present disclosure may be used for a wireless communication apparatus such as a user equipment (UE), a relay, and an eNB.

The invention claimed is:

1. A method of receiving at least one of a channel state information-reference signal (CSI-RS) or a demodulation reference signal (DMRS) by a user equipment (UE) in a wireless communication system, the method comprising:
   receiving at least one of the CSI-RS or the DMRS; and
   based on receiving the CSI-RS, calculating CSI by measuring the CSI-RS,
   wherein, based on the CSI-RS overlapping with an additional DMRS in a first Orthogonal Frequency Division Multiplexing (OFDM) symbol of a slot, the additional DMRS is dropped, and
   wherein, based on the CSI-RS overlapping with a default DMRS in a second OFDM symbol of the slot, the CSI-RS is dropped.

2. The method of claim 1, wherein the CSI-RS is not allocated to an OFDM symbol between an OFDM symbol for a physical downlink control channel (PDCCH) and an OFDM symbol for the DMRS.

3. A user equipment (UE) configured to receive at least one of a channel state information-reference signal (CSI-RS) or a demodulation reference signal (DMRS) in a wireless communication system, the UE comprising:
   a transmitter;
   a receiver; and
   a processor configured to control the transmitter and the receiver,
   wherein the processor is configured to control the UE to:
   receive at least one of the CSI-RS or the DMRS; and
   based on receiving the CSI-RS, calculate CSI by measuring the CSI-RS,
   wherein, based on the CSI-RS overlapping with an additional DMRS in a first Orthogonal Frequency Division Multiplexing (OFDM) symbol of a slot, the additional DMRS is dropped, and wherein, based on the CSI-RS overlapping with a default DMRS in a second OFDM symbol of the slot, the CSI-RS is dropped.

4. The UE of claim 3, wherein the CSI-RS is not allocated to an OFDM symbol between an OFDM symbol for a physical downlink control channel (PDCCH) and an OFDM symbol for the DMRS.

5. A method of transmitting at least one of a channel state information-reference signal (CSI-RS) or a demodulation reference signal (DMRS) by a base station (BS) in a wireless communication system, the method comprising:
   allocating at least one of the CSI-RS or the DMRS; and
   transmitting, to a user equipment (UE), the at least one of the CSI-RS or the DMRS,
   wherein, based on the CSI-RS overlapping with an additional DMRS in a first Orthogonal Frequency Division Multiplexing (OFDM) symbol of a slot, the additional DMRS is dropped, and
   wherein, based on the CSI-RS overlapping with a default DMRS in a second OFDM symbol of the slot, the CSI-RS is dropped.

6. The method of claim 5, wherein the CSI-RS is not allocated to an OFDM symbol between an OFDM symbol for a physical downlink control channel (PDCCH) and an OFDM symbol for the DMRS.

* * * * *